United States Patent [19]

Marcuse et al.

[11] Patent Number: 5,912,736
[45] Date of Patent: Jun. 15, 1999

[54] OPTICAL REFLECTION METHODS AND APPARATUS FOR ALIGNING COMMUNICATION SYSTEM COMPONENTS

[75] Inventors: Dietrich Marcuse, Lincroft; Herman Melvin Presby, Highland Park, both of N.J.

[73] Assignee: Lucent Technologies Inc., Murray Hill, N.J.

[21] Appl. No.: 08/755,668

[22] Filed: Nov. 25, 1996

[51] Int. Cl.⁶ .................................................. G01B 9/02
[52] U.S. Cl. ........................ 356/355; 356/73.1; 385/12
[58] Field of Search ................. 356/73.1, 355; 385/12, 14

[56] References Cited

U.S. PATENT DOCUMENTS

| | | | |
|---|---|---|---|
| 3,937,580 | 2/1976 | Kasdan | 356/354 |
| 4,363,827 | 12/1982 | Eichenbaum | 356/73.1 |
| 5,011,259 | 4/1991 | Lieber et al. | 385/12 |
| 5,208,885 | 5/1993 | Dragone et al. | 385/49 |
| 5,323,225 | 6/1994 | Dyott | 356/73.1 |

FOREIGN PATENT DOCUMENTS

| | | |
|---|---|---|
| 0506039A3 | 3/1992 | European Pat. Off. . |
| 050639A2 | 3/1992 | European Pat. Off. . |
| 0586964A1 | 8/1993 | European Pat. Off. . |
| 0737874A2 | 4/1996 | European Pat. Off. . |
| 0737874A3 | 4/1996 | European Pat. Off. . |
| 59-152412 | 2/1983 | Japan . |

OTHER PUBLICATIONS

Colin, A. Millar, Stephen R. Mallinson and George C. Warnes, "Cladding Alignment of Butted Optical Fiberts Using a Diffraction Alignment Device (DAD) and Its Application to Mode–Spot Concentricity–Error Measurement", 8217, IEEE Journal of Lightwave Technology, LT–3 (1985) Aug., No. 4, New York, USA.

XS MA 9730792010 Abstract, EPC.

Japanese patent application Sho 58 [1983]–179942, inventors: M. Watanabe, et als.

C.H. Henry et al., "Glass Waveguides on Silicon for Hybrid Optical Packaging", 7 J. Lightwave Technol., pp. 1530–1539 (1989).

E.J. Murphy, "Fiber Attachment for Guided Wave Devices", 6 J. Lightwave Technol., No. 6, pp. 862–871 (1988).

*Primary Examiner*—Robert H. Kim
*Attorney, Agent, or Firm*—Robert E. Rudnick; John M. Harman

[57] ABSTRACT

Measuring and setting techniques for relative component orientations and separations is accomplished by projecting a coherent light beam into one end of a gap formed between facing surfaces of adjacent components. This light beam projection causes a corresponding light ray pattern to be projected out of an opposite end of the gap. The arrangement of light rays in the resulting pattern is indicative of the relative positions of, and distance between, the facing surfaces. Such a projected pattern is used for determining the relative positions between adjacent components, alone, or as feedback for adjusting such component positions to achieve a desired orientation and/or separation distance between the components.

19 Claims, 7 Drawing Sheets

OPTICAL REFLECTION METHODS AND APPARATUS FOR ALIGNING COMMUNICATION SYSTEM COMPONENTS

FIELD OF THE INVENTION

The invention concerns techniques for measuring and/or setting the relative orientation and/or separation between adjacent components.

BACKGROUND OF THE INVENTION

During fabrication of optical and/or electrical communication systems, it is often desirable to precisely measure positions of adjacent components relative to one another and/or adjust such positions to achieve a desired orientation. For instance, it is advantageous to precisely align edge surfaces of integrated optical devices with other components, such as optical fiber array connectors for forming interconnections with relatively low insertion loss. However, conventional alignment techniques are crude and produce inconsistent results in forming low insertion loss interconnections.

More specifically, integrated optical devices are typically implemented as silica optical circuits having a layer of $SiO_2$ formed on a surface of a substrate, such as a silicon substrate, with integrated silica optical waveguide structures formed within the $SiO_2$ layer. Waveguides used for providing light signals to and/or from external components extend to an edge surface of the device. The basic structure of such devices is described in C. H. Henry et al., "Glass Waveguides on Silicon for Hybrid Optical Packaging", 7 J Lightwave Technol., pp. 1530–1539 (1989), which is incorporated by reference herein. Integrated optical devices advantageously enable the implementation of a variety of optical circuits, such as filters, couplers, switches in a compact device at relatively low fabrication cost.

An interconnection between an integrated optical device and an optical fiber array connector is typically formed by aligning and butt-coupling such components in the following manner. Respective optical fibers are secured in grooves of a V-groove substrate to form the array connector. Separations between grooves of the substrate are positioned to correspond to separations between the optical waveguide ends at the integrated optical device's edge surface. The optical fibers are secured in the V-groove substrate with their ends substantially flush with an edge surface of the substrate. These fiber ends and the integrated optical device edge surface are then polished.

The respective connector and integrated optical device edge surfaces are then brought into physical contact with one another typically to achieve alignment. Then, the device and connector are backed off from one another in a direction normal to the adjacent edge surfaces to a distance on the order of 10 $\mu$m. The resulting gap between the aligned facing surfaces of the device and connector is then filled with a UV or heat cured epoxy to connect the components.

However, consistently producing low insertion loss interconnections of less than 0.2 dB in such a manner has been problematic and difficult to achieve. Such interconnect methods have often produced interconnections with undesirably high insertion loss on the order of 0.5 dB. Such relatively high insertion loss is often attributable to scratching or chipping of the optical fiber ends when the fiber array connector is brought into contact with the integrated optical device edge surface. Also, the step of backing off the components from one another often causes the facing device and connector surfaces to lose their parallel alignment. Such misalignment disadvantageously causes an increase in insertion loss of subsequently formed interconnections.

As a consequence, there is a recognized need for enhanced techniques for measuring and/or setting the relative positions of adjacent components that is useable for consistently achieving optical component interconnections with reduced signal loss.

SUMMARY OF THE INVENTION

The invention is based on the realization that projecting a coherent light beam into one end of a gap formed between substantially reflective facing surfaces of adjacent components causes a corresponding light ray pattern to be projected out of an opposite end of the gap. The characteristics of this resulting light ray pattern is indicative of the relative orientation of, and distance between, the facing surfaces. In accordance with the invention, the projected pattern is useable for determining the position of adjacent components relative to one another, alone or, as feedback for adjusting such positions to achieve a desired relative orientation and/or separation distance between facing components surfaces.

For instance, the invention is useable for aligning integrated optical devices with optical fiber array connectors or other integrated optical devices in forming optical interconnections. After such alignment is achieved, the components can be butt-coupled to produce the interconnections. In such a manner, it is possible to consistently produce optical interconnections between such components with relatively low insertion losses of less than approximately 0.2 dB.

It is possible to partially or fully automate the setting of the relative component positions according to one embodiment of the invention by employing a light sensitive detector for detecting the projected light ray pattern. Such a light detector can provide feedback for a controller that controls the movement of a multi-axis positioner holding the components to achieved a desired orientation. Such a technique is further useful in setting the relative positions of other types of optical devices as well as densely packed components of wireless communication systems and other component systems, such as multi-chip modules. The invention is also useful for accurately measuring the separation distance between facing surfaces of adjacent components.

Additional features and advantages of the present invention will become more readily apparent from the following detailed description and accompanying drawings.

DETAILED DESCRIPTION

The invention concerns techniques for measuring and setting relative positions of adjacent components by projecting a coherent light beam into a gap between facing surfaces of such components to cause a corresponding light ray pattern to be projected out of the gap that is indicative of the relative positions of the facing surfaces. According to one embodiment of the invention, the projected pattern is used alone to determine the relative positions and/or separation distance between the components. According to another embodiment of the invention, the projected pattern is used as feedback for adjusting relative positions of the components to achieve a desired relative orientation and/or separation distance.

Figure 1:
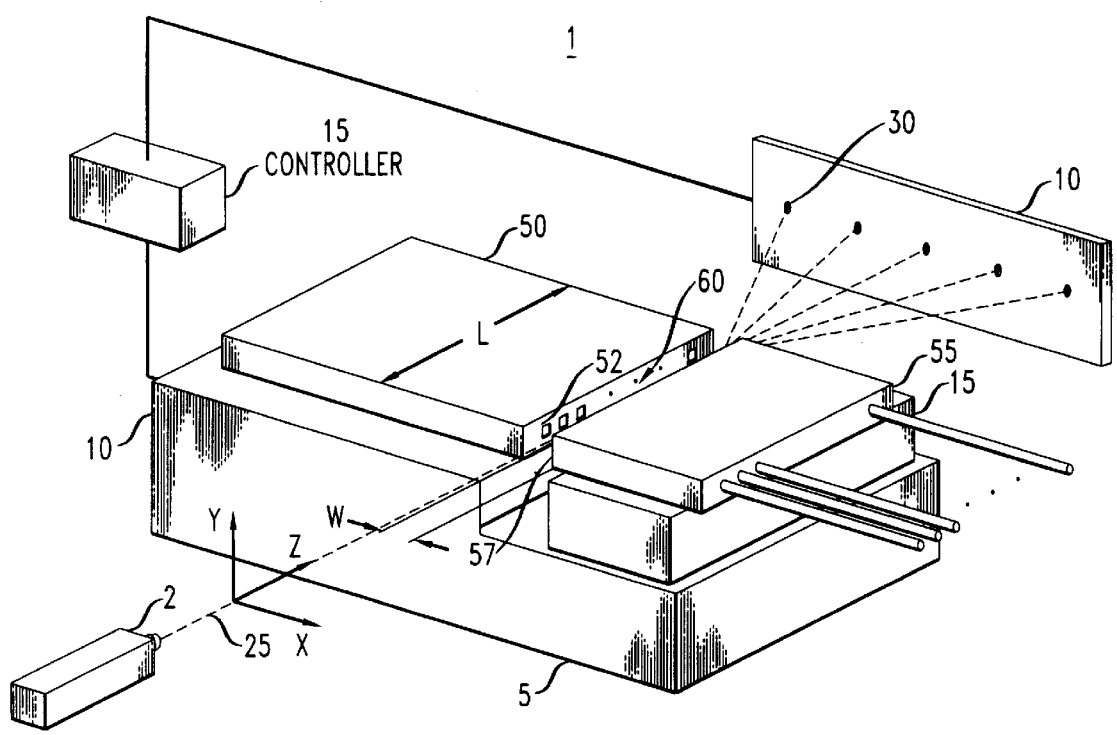
FIG. 1 illustrates a schematic block diagram of an exemplary positioning apparatus configuration in accordance with the invention.

Numerous apparatus configurations can be used for performing the measuring and/or setting of relative component positions according to the invention. An exemplary configuration 1 for aligning components 50 and 55 is shown in FIG. 1 for illustration purposes only and is not meant to be a limitation of the invention. The configuration 1 has not been drawn to scale for ease of explanation. In FIG. 1, the configuration 1 includes a coherent light source 2 such as a laser, a positioner 5, light pattern detector 10 and controller 15. The components 50 and 55 are secured to fixed and moveable bases 10 and 15 of the positioner 5, respectively. The moveable base 15 is moveable relative to the fixed base 10.

The particular apparatus employed for the positioner 5 is not critical to practicing the invention and can, for example, be a multi-axis positioner such as a conventional six axis positioner manufactured by Melles Griot of Irvine, Calif. In such a positioner 5, the base 15 is capable of translational movement in three orthogonal directions relative to the fixed base 10 as well as rotational movement around axes corresponding to such orthogonal directions. It is also possible for the base 15 to have a smaller number of movement options which may correspondingly limit the attainable relative positions of the components 50 and 55.

The alignment of an integrated optical device, such as a silica optical circuit, and a optical fiber array connector as the components 50 and 55, respectively, is shown for illustration purposes only and is not meant to be a limitation of the invention. In achieving such alignment, it is advantageous to employ a positioner 5 that is capable of relative movement having a resolution on the order of nanometers. In addition, it is alternatively possible to align other types of components according to the invention, including, for example, optical, electrical and/or mechanical devices requiring relatively precise measurement or alignment.

With regard to the integrated optical device and optical fiber array connector, the invention concerns the setting of the facing surfaces of the components in a parallel alignment, and another technique should be employed for aligning the respective optical fibers with the waveguide ends at the edge of the integrated optical device. Such other technique is not critical to practicing this invention, and can, for example, be the technique described in E. J. Murphy, "Fiber Attachment for Guided Wave Devices", 6 *J. Lightwave Technol.*, no. 6, pp. 862–871 (June 1988), which is incorporated by reference herein. After the desired alignment has been achieved according to the invention, interconnections can be formed by disposing a UV or heat cured epoxy or adhesive in a gap formed between the components. In the alternative, the formed gap can be filled with a substantially translucent material, such as a gel, and the components can then be soldered together. In such a manner, it is possible to consistently produce optical interconnections between such components with relatively low insertion losses of less than approximately 0.2 dB.

According to one embodiment of the invention, the configuration 1 adjusts the relative positions of the components 50 and 55 such that their facing edge surfaces 52 and 57 have a desired relative orientation and separation. For instance, it is possible to adjust relative positions of the components 50 and 55 such that the edge surfaces 52 and 57 have a parallel alignment or other desired relative orientation and separation. In operation, the coherent light source 2 provides a coherent light beam 25 into a gap 60 formed by the facing surfaces 52 and 57 causing a corresponding light ray pattern 30 to be projected on to the detector 10. The light beam 25 can be regarded as a bundle of parallel light rays substantially filling the gap 60. The particular arrangement of the light rays of the projected pattern 30 is indicative of the relative positions of the facing surfaces 52 and 57 as described in greater detail with regard to FIGS. 2A to 7.

The pattern detector 10 provides a signal to the controller 15 containing information concerning the detected light ray pattern 30. The controller 15 is responsive to the received signal and controls the positioner 5 to adjust the position of the moveable base 15 and corresponding component 55, accordingly, for achieving the desired orientation and/or separation. The particular device employed for the pattern detector 10 is not critical to practicing the invention and can be one of a variety of light sensitive devices including, for example, a video camera and one- or two-dimensional arrays of photodetectors, charge-coupled devices (CCD) or active pixel sensors. Also, it is possible for the controller 15 to be a digital processor for processing the signal received from the detector 10 based on stored instructions including, for example, a microprocessor, microcontroller, application specific integrated circuit or a computer. Alternatively, an analog circuit can be used in the controller 15 for processing an analog signal generated by the detector 10.

The pattern detector 10 should include information in the signal regarding at least the detected positions where the pattern's light rays strike the detector 10. It is Ether advantageous for such a signal to contain information concerning the relative intensity of the detected light rays. It is possible for the controller 15 to employ the detector signal as substantially continuous or intermittent feedback to verify the corresponding relative orientation or separation distance as the component 55 is moved relative to the component 50. The controller 15 can also adjust the relative positions of the components 50 and 55 to achieve the desired relative orientation and/or separation based on the detector signal for a single detected relative position of the components 50 and 55. It is alternatively possible to use a projection screen instead of the detector 10 and controller 15, wherein an operator of the configuration 1 controls the positioner 5 to adjust the relative component positions based on an observed projected light ray pattern on the projection screen.

In producing a light ray pattern according to the invention, it is critical for the component surfaces 52 and 57 to be substantially reflective such that they can each reflect greater than approximately 50% of incident light. Lower reflectance values for such surfaces tend to produce light ray patterns having disadvantageously low light intensities approaching that of conventional detector noise floors. However, if a pattern detector 10 is employed which can detect and distinguish such low intensities, then component surfaces having lower reflectivity can be used.

It is also possible to measure and set the relative positions of components having facing surfaces with undesirably low reflectivity according to the invention by coating the surfaces with a reflective material, such as, for example, silver or aluminum, to achieve the needed reflectivity. Further, such reflective coating can be removed, if desired, after the measuring and/or setting of the relative positions of the components is accomplished.

It is advantageous to employ the measuring and setting technique of the invention for components having a formed gap 60 between the facing component surfaces with a ratio of length L to width W of approximately 5:1 or greater. If larger gap widths or shorter gap lengths are employed, then the amount of distinguishing features in the corresponding projected light ray pattern 30 is reduced which can make measurement difficult. However, such smaller length-to-width ratios can be used if the corresponding projected pattern 30 provides sufficient information for providing a desired accuracy in determining the relative orientation and separation of the components 50 and 55.

The light ray pattern 30 projected on the detector 10 is produced by one or a combination of (1) reflection of the light beam 25 from the respective surfaces 52 and 57, (2) portions of the light beam 25 that travel through the gap unhindered, i.e., not reflected by the facing surfaces 52 and 57, and (3) light diffraction. Typically, the projected pattern 30 includes at least one primary region of light intensity caused by reflection and/or unhindered portions of the light beam 25 superimposed over secondary regions of varying light intensities caused by diffraction of the light beam 25. The primary light ray regions typically have greater light intensity, often on the order of 10 dB or greater, than the secondary light ray regions.

The particular arrangement of the component surfaces 52 and 57 relative to one another can eliminate projected light rays in the pattern 30 due to either reflection or unhindered portions of the light beam 25, and to lesser extent diffraction. For instance, as the width W of the gap is increased, the light rays due to reflection causing primary light regions are more readily detectable than the secondary light ray regions of the projected pattern due to diffraction. In contrast, as the gap width W is decreased, the secondary light ray regions are more readily detectable than the primary light regions. The primary light regions produced by unhindered portions of the light beam 25 are eliminated when a sufficiently large angle of the light beam 25 is used relative to the gap 60 in a direction of either surface 52 or 57 as described in greater detail below.

The relationship of the primary and secondary light ray regions in the pattern 30 indicate the relative orientation and separation of the respective surfaces 52 and 57. Exemplary relationships of the primary and secondary light ray regions with particular component surface relative positions is described in greater detail with respect to FIGS. 2A–7. Detecting a pattern 30 possessing one or more of such relationships enables the controller to determine the positions of the component surfaces 52 and 57 relative to one another, and if desired, to adjust such relative positions to achieve the desired orientation. FIGS. 2A, 3A, 4A and 5A, show exemplary arrangements of primary light ray regions of a projected pattern 30 for the different relative component positions depicted in FIGS. 2B, 3B, 4B and 5B, respectively.

Figure 6:
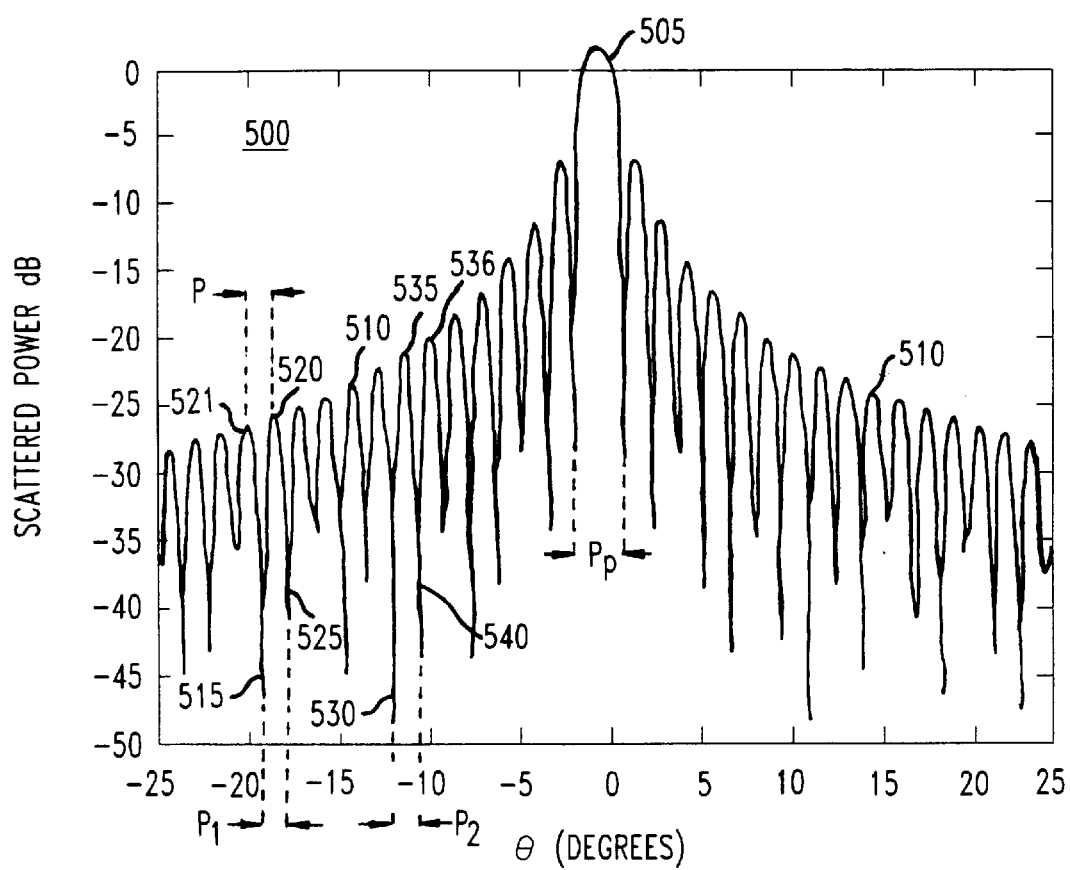
FIGS. 6 and 7 illustrate exemplary projected diffraction patterns corresponding to particular orientations of components shown in the configuration of FIG. 1.
Figure 7:
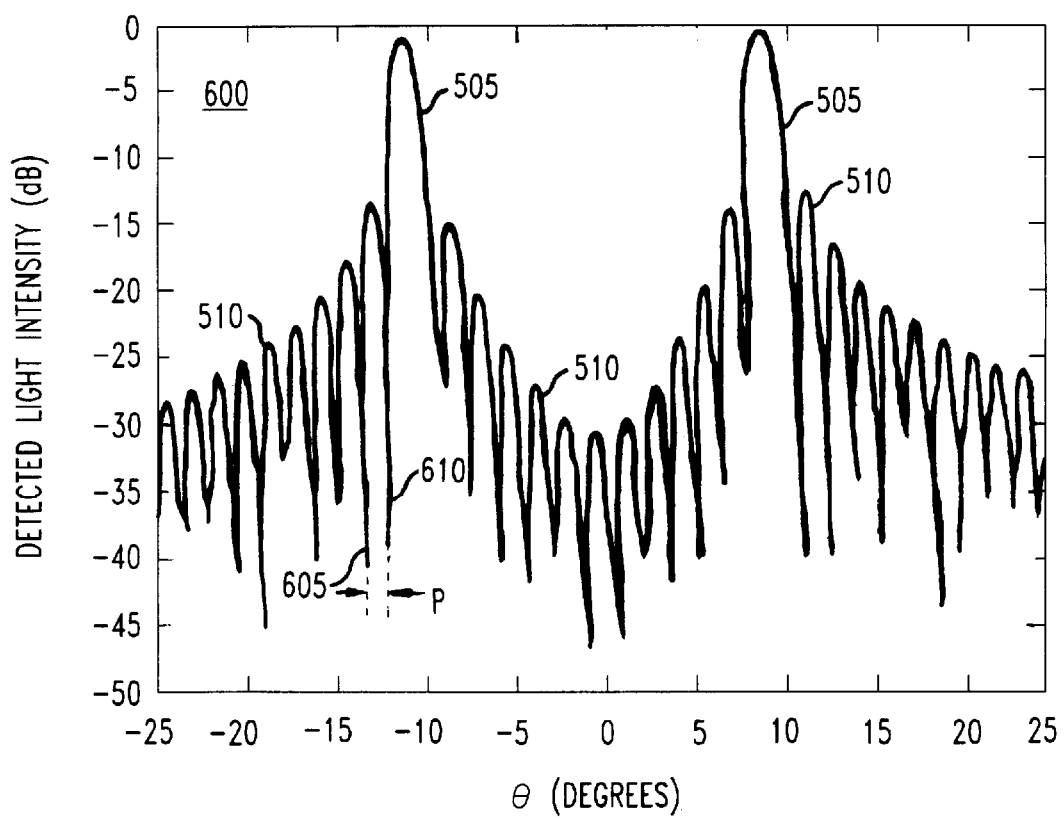

Similar elements in FIGS. 1 and 2B, 3B, 4B and 5B are like numbered for clarity such as the components 50 and 55 and light beam 25. The secondary light ray regions caused by diffraction of the light beam 25 have not been shown in FIGS. 2A, 3A, 4A and 5A for ease of explanation purposes. However, secondary light ray regions are produced by such relative component positions. Secondary light ray regions in combination with primary light ray regions of exemplary projected patterns are shown in FIGS. 6 and 7, described below.

Figure 2A:
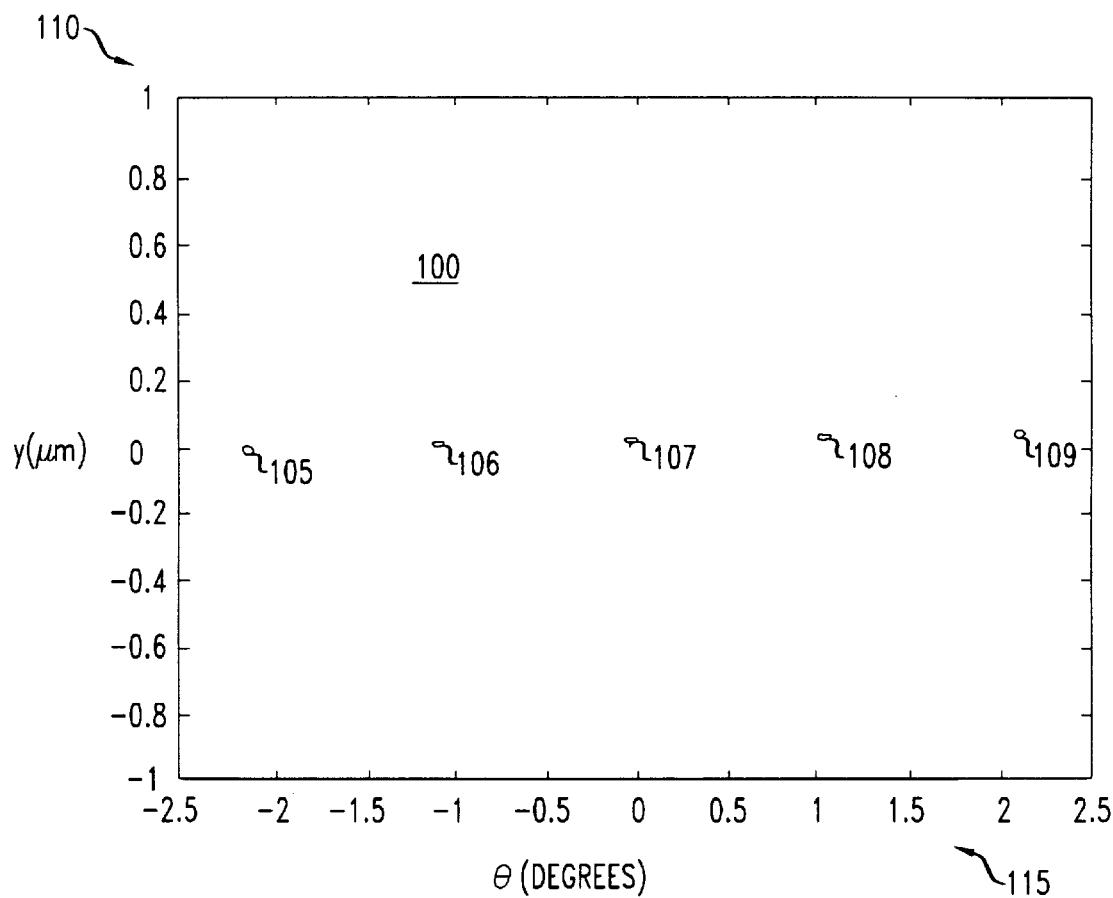
FIGS. 2A to 5B illustrate exemplary projected light ray patterns corresponding to particular orientations of components shown in the configuration of FIG. 1.
Figure 2B:
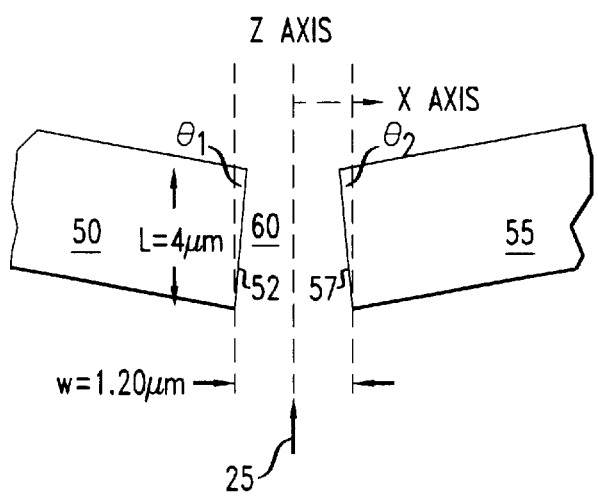

FIG. 2A shows a particular pattern arrangement 100 of primary light ray regions produced by the component arrangement shown in FIG. 2B. FIG. 2B shows a top view of the components 50 and 55 which are aligned along the y-axis, shown in FIG. 1. Further, in FIG. 2B, the components 50 and 55 are positioned such that the surfaces 52 and 57 are at respective angles of $\phi_1=+0.6°$ and $\phi_1=-0.6°$ relative to the z-axis bisecting the formed gap 60. The length L of the gap 60 between the facing surfaces 52 and 57 is 4 mm and the end of the gap receiving the light beam 25 has a width W of 120 $\mu$m. The gap 60 narrows in the direction of light beam travel due to the respective positive and negative angles for the angles $\Phi_1$ and $\Phi_2$ and is referred to as a narrowing gap.

Such a component arrangement causes the primary light ray pattern 100 of FIG. 2A with five symmetrical positioned light ray regions 105, 106, 107, 108 and 109. The reference scales 110 and 115 provided in the right and bottom margins of FIG. 2A have been shown for discussion purposes and need not appear on the pattern detector 10. However, if a projection screen is employed instead of the detector 10, it is advantageous to include such reference scales on the projection screen for ease of use by an operator. An angle $\theta$, shown in bottom margin 115, corresponds to angular positions or displacement of the light ray regions relative to the z-axis bisecting the gap as shown in FIG. 2B. In FIG. 2B, the light beam 25 is directed substantially along the z-axis.

In the pattern 100, the light ray region 107 at position $\theta=0°$ is produced by the portion of the light beam 25 passing unhindered through the gap. The light ray region 106 at approximately position $\theta=-1°$ is produced by a portion of the light beam 25 once reflected from the angled surface 57. The corresponding light ray region 108 at approximately position $\theta=1°$ is also produced by a light beam portion once-reflected from the angled surface 52. The portions of the light beam 25 producing the regions 106 and 108 are referred to as once-reflected portions since they each reflect once from the respective angled surfaces 52 or 57. Further, the light ray regions 105 and 109 at positions $\theta=-2.2°$ and $2.2°$ are produced by portions of the light beam 25 twice-reflected. More specifically, portions of the light beam 25 are reflected once from the surface 57 and then once from the surface 52 to produce the light ray region 109. In a similar manner, the light ray region 105 is formed by portions of the light beam 25 reflected once from the surface 52 and then once from the surface 57. Also, since the surface 52 and 57 are aligned with respect to the y-axis, the respective light ray regions 105 to 109 substantially intersect a straight line relative to the left margin 110.

It is possible to align the components 50 and 55 such that, for example, the surfaces 52 and 57 are in a parallel relationship by reducing the relative angles $\phi_1$ and $\phi_2$ between such surfaces. Such parallel alignment can be accomplished by the controller 15 of FIG. 1 controlling the positioner 5 in the following manner. Movement of the component 55 causing a reduction in the relative angle $\phi$ will tend to cause the number of primary light ray regions to decrease and the positions of such regions to move closer to position $\theta=0°$. Correspondingly, movement of the component 55 that increases the relative angles tends to cause an increase in both the number of primary light ray regions and separation between such projected regions. Also, according to the invention, it is possible for the controller 15 to arrange the components 50 and 55 with their surfaces 52 and 57 in a desired non-parallel orientation by moving the relative positions of the components until the projected primary light ray regions that correspond to the desired relative positions are detected.

If the light beam 25 were directed at a slant angle relative to the z-axis in a plane formed by the y- and z-axes which corresponds to a direction into, or out of, the drawing, then a pattern of primary light ray regions would be produced that is substantially the same as the pattern 100, but at a higher or lower position relative to the y-axis shown in the left margin.

Figure 3A:
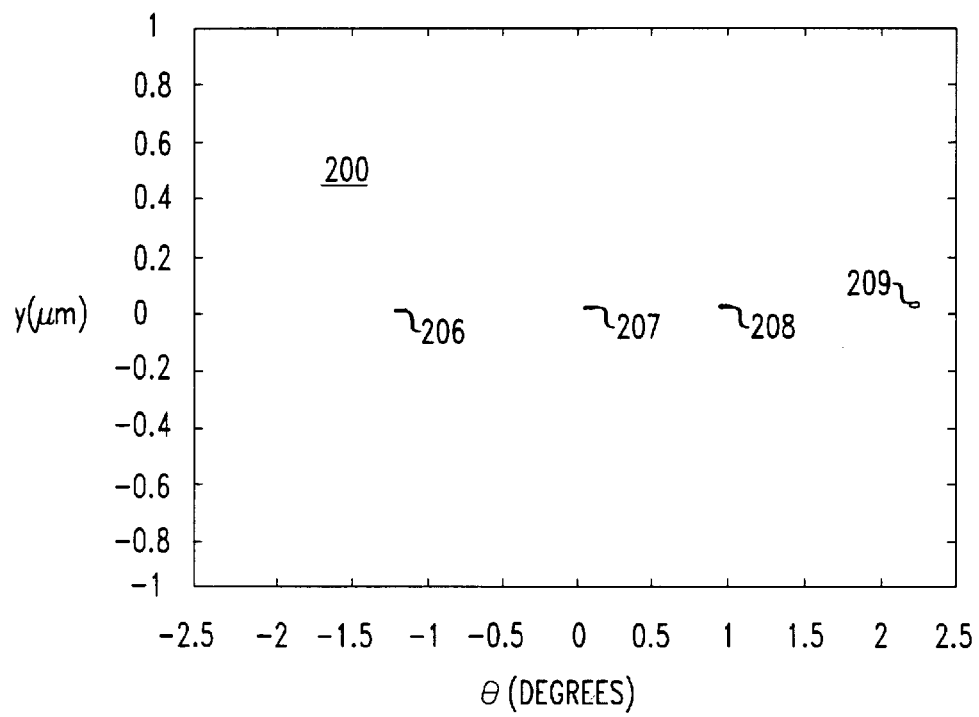
Figure 3B:
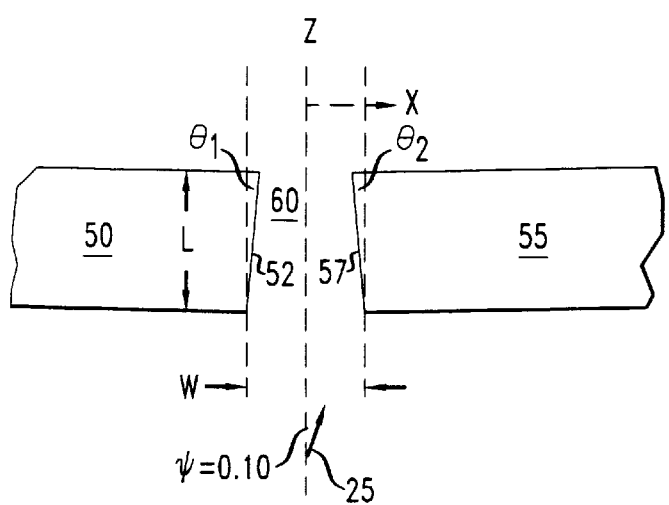

The primary light ray pattern 100 of FIG. 2A is produced by the symmetrical relationship of the component surfaces 52 and 57 relative to the light beam 25 as shown in FIG. 2B. However, it is possible to use the measurement and relative position and orientation technique of the invention where a non-symmetrical relationship exists between the surfaces 52 and 57 and the light beam 25. For instance, FIG. 3A shows a pattern 200 similar to the pattern 100 of FIG. 2A produced by substantially the same relative component surface orientations $\phi_1$ and $\phi_2$ and spacing W of FIG. 2B, but with the light beam 25 directed at slant angle $\psi=0.1°$ relative to the z-axis and in the x-z-plane as shown in FIG. 3B. The pattern 200 includes primary light ray regions 206, 207, 208 and 209. Since the surface 52 and 57 are aligned with respect to the y-axis, the respective light ray regions 206 to 209 substantially appear on the detector 10 in a straight line relative to the y-axis in a like manner to that shown in FIG. 2A. However, in FIG. 3A, the light ray regions 205–209 are not symmetrically positioned relative to position $\theta=0°$ because of the slant angle $\psi$ of the light beam 25 from the z-axis.

More specifically, the light ray region 207 is produced by a portion of the light beam 25 not reflected by surfaces 52 and 57 and corresponds to the light ray region 107 in FIG. 2A. However, the light ray region 207 is shifted to position $\theta=0.1°$ because of the corresponding light beam slant angle $\psi=0.1°$. The portions of the light beam 25 once-reflected by the angled surface 57 produce asymmetrical light ray regions 206 and 208 relative to position $\theta 0=0°$. The light ray region 206 is shifted relative to the position $\theta=-1°$ because of the combination of the light beam slant angle $\psi=0.1°$ and the relative angle $\phi=-0.6°$ of the component surface 57. Twice-reflected light beam portions produce the light ray region 209 corresponding to the light ray region 109 of FIG. 2A. However, the light ray region 209 appears shifted due to the light beam slant angle $\psi$. Further, no light beam portions are twice-reflected that would produce a light ray region in FIG. 3A that corresponds to the pattern 105 of FIG. 2A.

Figure 4A:
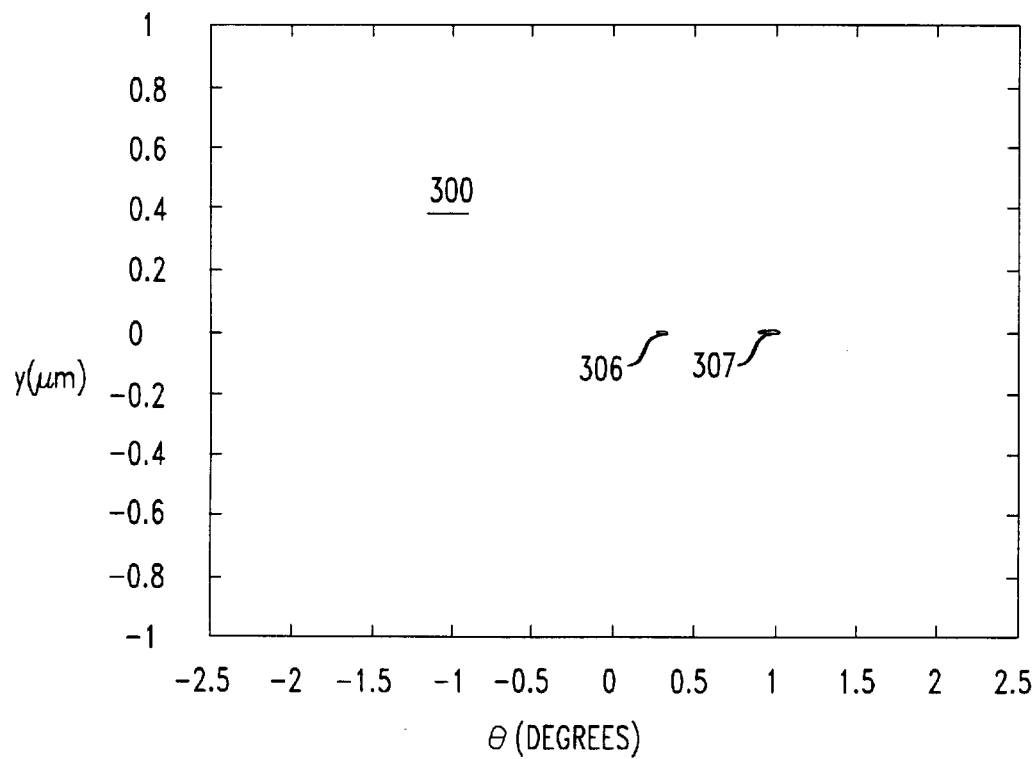
Figure 4B:
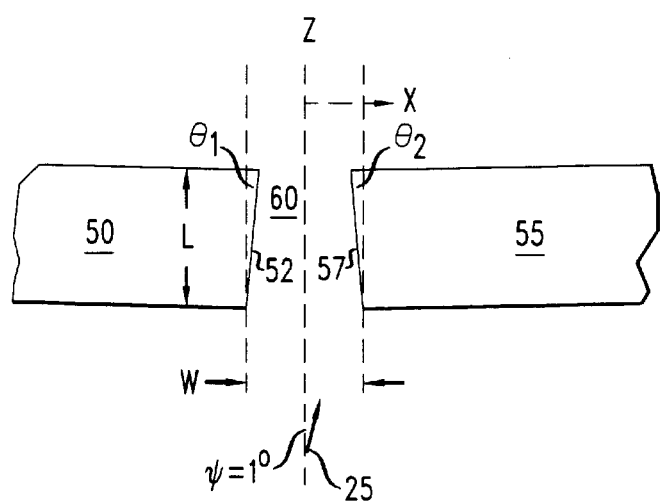

FIG. 4A shows a particular projected pattern 300 corresponding to a formed gap having a width W of 120 μm at its end receiving the light beam 25 and with the component surfaces 52 and 57 at respective angles of $\phi_1=-0.6°$ and $\phi_2=+0.6°$ relative to the z-axis such that the gap is wider near the detector 10 as shown in FIG. 4B. A light beam slant angle $\psi=1°$ is also employed as used in the configuration shown in FIG. 4B. The widening relationship of the surfaces 52 and 57 in the direction of travel of the light beam 25 is referred to as a widening gap. In FIG. 4A, the pattern 300 includes primary light ray regions 306 and 307. The light ray region 307 at position $\theta=1°$ corresponds to portions of the light beam 25 unhindered or not reflected by the reflective surfaces 52 and 57. The light ray region 306 is produced by a once-reflected portion of the light beam 25.

If an insufficient slant angle $\psi$ for the light beam 25 is used for widening gaps, then only a single light ray region is produced because the light beam 25 would not be reflected by either of the surfaces 52 and 57. Moreover, the controller 15, shown in FIG. 1, can advantageously use the characteristic that a widening gap has fewer light ray regions for a light beam slant angle while a narrowing gap produces a corresponding greater number of light ray regions as is illustrated in FIGS. 2A, 3A and 4A, to determine the relative positions of components or to achieve a desired orientation and/or separation of such components.

Figure 5A:
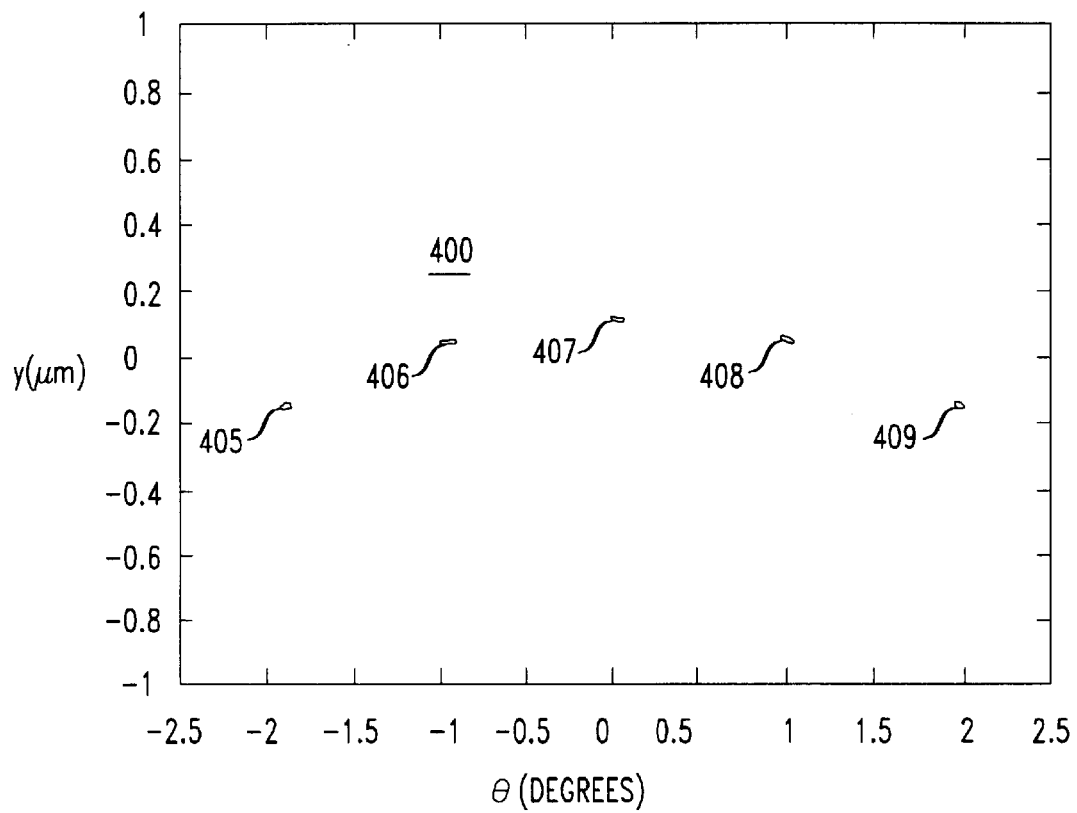
Figure 5B:
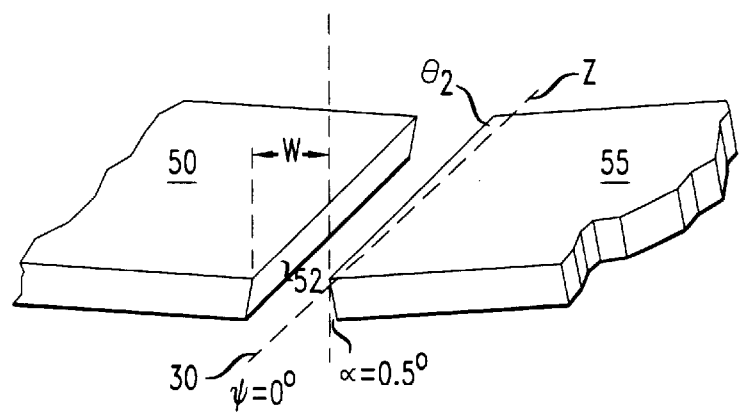

FIG. 5A depicts a projected pattern 400 resulting from one of the surfaces 52 or 57 being misaligned with respect to the y-axis as shown by the configuration in FIG. 5B. In FIG. 5B, the component positions produce a narrowing gap with angles $\phi_1=+0.6°$ and $\phi_2=-0.6°$, and entrance gap width W of 120 μm as in FIGS. 2B and 3B. In addition, the component 55 is slanted $\alpha=0.5°$ relative to the y-axis. In the depicted configuration, the light beam 25 is directed along the z-axis, i.e., a slant angle $\psi=0°$.

The pattern 400 of FIG. 5A resulting from such a configuration includes primary light ray regions 405, 406, 407, 408 and 409 projected around an effective arc on the detector 10. In particular, the light ray region 407 corresponds to portions of the light beam 25 not reflected by either surface 52 or 57. The light ray regions 406 and 408 correspond to once-reflected portions of the light beam 25 and are appear lower than the light ray region 407 relative to the right margin or y-axis. In a similar manner, the light ray regions 405 and 409 correspond to twice-reflected light beam portions and appear lower than position the light ray region 407 or the light ray regions 405 and 409 relative to the y-axis shown in the left margin.

The controller 15 of FIG. 1 can identify that a surface is not aligned with the y-axis based on the different positions of the projected light ray regions relative to the y-axis. Moreover, the particular angle formed between the respective light ray regions and the y-axis directly indicate the relative angle of the component surface 57 with respect to the y-axis. As a consequence, upon detection of a projected pattern 30 having primary light ray regions arranged in an arc-like manner, the controller 15 can control the positioner 5 to adjust the relative position of the component 55 relative to the y-axis to achieve a desired relative orientation of the components 52 and 57.

FIGS. 6 and 7 show representative diagrams 500 and 600 of light intensity and location of exemplary primary and secondary light ray regions of exemplary projected diffraction patterns. The diagrams 500 and 600 are based on the facing component surfaces 52 and 57 being in substantially parallel alignment with the formed gap 60 having a width W=25 μm and length L of 4 mm. The diagrams 500 and 600 where produced with the light beam 25 having a wavelength λ of 632.8 nm and slant angle of $\psi=0°$ and 10°, respectively. It is possible to generate a light beam having such a wavelength using a conventional helium-neon laser. In FIGS. 6 and 7, principal lobes 505 represent the primary light ray regions caused by reflection and unhindered light beam portions and correspond to the light ray regions shown in FIGS. 2A, 3A, 4A and 5A. Secondary lobes 510 correspond to the secondary light ray regions caused by diffraction.

In FIG. 6, the light beam slant angle $\psi=0°$ produces a single principal lobe 505 at $\theta=0°$ due to a substantial portion of the light beam 25 passing unhindered through the gap formed by the parallel component surfaces 52 and 57. However, in FIG. 7, although an identical gap is formed by like parallel component surfaces 52 and 57, two principal lobes 505 are produced because of the light beam slant angle $\psi=10°$.

The secondary lobes 510 of FIGS. 6 and 7 have varying light intensities across the projected patterns. Further, these secondary lobes 510 are periodic with respect to the bottom margin, and with the periods of the lobes 510 being substantially equal. According to an aspect of the invention, the period of the secondary lobes 510 are advantageously used to determine the gap width W corresponding to the separation between the facing surfaces 52 an 57 of FIG. 1. In particular, the separation distance or gap width W can be determined from the relationship W=λ/P, wherein P corresponds to the substantially common secondary lobe period in radians and λ is the wavelength of the light beam 25. In FIG. 6, the common secondary lobe period is 1.45° and a helium-neon laser having a wavelength λ=632.8 nm is used for the light source 2. As a consequence, the component separation W corresponding to the depicted pattern 500 in FIG. 6 is W=λ/P=632.8 nm/(1.45°×(2π rads/360°))=25 μm which agrees with the previously stated gap width for FIG. 6.

Numerous techniques can be used to determine the secondary lobe period P according to the invention. For instance, the period P can be measured between peaks of adjacent secondary lobes 510. Thus, in FIG. 6, the period P of approximately 1.45° can be measured between adjacent secondary lobe peaks including, for example, between lobe peaks 520 and 521, and between lobe peaks 535 and 536. It is also possible to determine the secondary lobe period P by detecting the distances between local minima's adjacent a secondary lobe 510. Accordingly, widths $P_1$ and $P_2$ of approximately 1.45° can be measured between minima's 515 and 525 adjacent the secondary lope 520 and between minima's 530 and 540 adjacent the secondary lope 535. It is often possible to more easily detect the locations of local minima's of a projected light ray pattern relative to detecting secondary lobe peak locations due to the typically sharp transitions of local minima's as shown in the FIGS. 6 and 7.

In the alternative, the number of secondary lobe peaks or local minima's can be counted over a particular section of the projected pattern 30 to advantageously determine the secondary lobe period P. In this manner, the period P is determined by dividing the width of the particular section in radians by the lobe or minima count. Such a period determination method typically is relatively accurate because it tends to reduce resolution errors by the detector 10 or an operator viewing a projection screen, as compared to measuring a single secondary lobe.

Moreover, the determination of the separation distance W between surfaces 52 and 57 in the previously described manner is substantially independent of the light beam slant angle ψ. The pattern 600 of FIG. 7 was produced from the gap geometry as the pattern 500 in FIG. 6, but with a different light beam slant angle ψ. Thus, the corresponding secondary lobe period P is approximately the same 1.45° as for the pattern 500 of FIG. 6. Such a period P can be seen between local minima's 606 and 610 adjacent a secondary lobe in FIG. 7. Also, a width $P_p$ of the principal lobes 505 in FIGS. 6 and 7 caused by reflection or unhindered portions of the light beam 25 correspond to twice the secondary lobe period P. Accordingly, it is also possible to determine the separation distance W based on the width of the principal lobe $P_p$ according to the expression: W=2λ/$P_p$.

The previously described component separation expressions determine the gap width W for parallel facing component surfaces. Such expressions can also be used to determine the separation distance of the narrower gap end of a narrowing gaps. Further, for widening gaps, such expressions can be used to identify the separation distance W of the narrower gap end as long as the relative angle φ of the component surfaces is sufficiently large to substantially prevent the light beam 25 from being reflected by either of the component surfaces 52 and 57. However, if the relative angles $φ_1$ and $φ_2$ of the component surfaces is not sufficiently large, other techniques are useable for identifying the separation distance between the facing surfaces. One possible alternative technique is to turn the components having such a widening gap arrangement around in the configuration 1 to produce a corresponding narrowing gap configuration. In this manner, the separation distance can be determined using in the previously described expressions.

Referring again to FIG. 1, the controller 15 can use the previously described techniques for identifying the separation between the components 50 and 55 and adjusting relative positions of the components to achieve a desired component separation. Moreover, it is possible to combine these separation techniques with the relative orientation setting techniques previously described with regard to FIGS. 2A–5B to achieve desired relative orientations and separations for components according to the invention.

Although several embodiments of the invention have been described in detail above, many modifications can be made without departing from the teaching thereof. All of such modifications are intended to be encompassed within the following claims. For instance, although the inventive orientation and separation setting and measuring techniques has been described with regard to FIGS. 1–7 for achieving desired relative positions of components, it is also possible for such techniques to measure the relative positions of two components alone according to the invention. In such an embodiment it is possible to omit the positioner 5 of FIG. 1, wherein the controller 15 provides information regarding a determined orientation and/or separation based on a detected light ray or other processing device.

The invention claimed is:

1. A method of adjusting positions of adjacent components relative to one another comprising the steps of:
    directing a coherent light beam into one end of a gap formed by facing surfaces of said components, wherein said directed light beam is reflected from the facing surfaces of said components and causes a projection of a light ray pattern out of an opposite end of said gap;
    detecting characteristics of said projected light ray pattern; and
    adjusting the position of one of said components relative to the other of said components based on said detected pattern characteristics to achieve a desired relative orientation and/or separation between said components.

2. The method of claim 1 wherein a length of said gap in a direction of said light beam is at least five times longer than a separation distance between said facing component surfaces.

3. The method of claim 1 wherein said step of detecting projected light ray pattern characteristics includes the steps of identifying positions of illuminated pattern regions due to reflection.

4. The method of claim 1 wherein said step of detecting projected light ray pattern characteristics includes the steps of identifying positions of illuminated pattern regions due to diffraction.

5. The method of claim 1 further comprising the step of determining relative component positions based on said detected pattern characteristics, wherein said step of adjusting the position of one of said components is based on said determined relative positions.

6. The method of claim 5 wherein said step of determining relative component positions includes the step of determining a separation distance between said components based on a detected period of light intensity for illuminated pattern regions due to diffraction.

7. The method of claim 1 further comprising the step of coating at least one of said surfaces with a substantially reflective material.

8. The method of claim 7 further comprising the step of removing said coating after the desired relative orientation has been achieved.

9. The method of claim 1 wherein at least one of said components is an integrated optical device and said method farther comprises the step of coupling the component to said device after the desired relative orientation and/or separation has been achieved.

10. A method of determining relative positions of facing surfaces of adjacent components comprising the steps of:

directing a coherent light beam into one end of a gap formed by said facing surfaces, wherein light reflects off of the facing surfaces of said components to project a light ray pattern out of an opposite end of said gap;

detecting characteristics of said projected light ray pattern; and determining said relative positions based on said detected pattern characteristics.

11. The method of claim 10 wherein a length of said gap in a direction of said light beam is at least five times longer than a separation distance between said facing component surfaces.

12. The method of claim 10 wherein said step of detecting projected light ray pattern characteristics includes the steps of identifying positions of illuminated pattern regions due to reflection.

13. The method of claim 10 wherein said step of detecting projected light ray pattern characteristics includes the steps of identifying positions of illuminated pattern regions due to diffraction.

14. The method of claim 13 wherein said step of determining said relative positions includes the step of determining a separation distance between said components surfaces based on a detected period of light intensity of said projected light ray pattern portions due to diffraction.

15. The method of claim 10 further comprising the step of adjusting the position of one of said components relative to the other of said components based on said determined relative positions to achieve a desired relative orientation and/or separation.

16. The method of claim 10 further comprising the step of coating at least one of said surfaces with a substantially reflective material.

17. The method of claim 16 further comprising the step of removing said coating after said alignment has been determined.

18. An apparatus for setting desired relative positions of first and second components relative to one another comprising:

a controllable positioner, said positioner for retaining said components and for adjusting a relative position of said first component relative to said second component;

a coherent light source, said light source for directing a coherent light beam into a gap formed by facing surfaces of said components;

a light ray pattern detector, said detector for detecting a pattern of light rays projected from said gap by reflection of light from the facing surfaces of said components; and a controller coupled to said positioner and said light ray pattern detector, said controller for determining characteristics of a light ray pattern detected by said detector and controlling said positioner to adjust said positions based on said determined characteristics.

19. An apparatus for determining relative positions of first and second adjacent components with respect to one another comprising:

a coherent light source, said light source for directing a coherent light beam into a gap formed by facing substantially reflective surfaces of said components;

a light ray pattern detector, said detector for detecting a pattern of light rays projected from said gap by reflection of light from the facing surfaces of said components; and a processor coupled to said light ray pattern detector, said processor for determining characteristics of a light ray pattern detected by said detector and determining said relative positions based on said detected pattern characteristics.

* * * * *